United States Patent [19]
Maggioni

[11] 3,914,324
[45] Oct. 21, 1975

[54] PROCESS FOR THE PREPARATION OF DIPHENOLS

[75] Inventor: Paolo Maggioni, Como, Italy

[73] Assignee: Brichima S.p.A., Milan, Italy

[22] Filed: Apr. 4, 1974

[21] Appl. No.: 457,985

Related U.S. Application Data

[62] Division of Ser. No. 218,557, Jan. 17, 1972, Pat. No. 3,836,591.

[30] Foreign Application Priority Data
July 17, 1971  Italy .................................. 26963/71

[52] U.S. Cl. .......................... 260/621 G; 260/631 R
[51] Int. Cl.$^2$ .................... C07C 27/00; C07C 37/00
[58] Field of Search ...................... 260/621 G, 631 R

[56] References Cited
UNITED STATES PATENTS
3,514,490   5/1970   Marlard ........................... 260/621 G

*Primary Examiner*—Norman P. Morgenstern
*Attorney, Agent, or Firm*—Stevens, Davis, Miller & Mosher

[57] ABSTRACT

Process for the preparation of catechol and hydroquinone in admixture, by hydroxylation with hydrogen peroxide, wherein phenol is reacted with hydrogen peroxide in the presence of an acid catalyst selected in the group consisting of trifluoroacetic acid and acids having a ph comprised between 0.7 and 3 as well as of a monocarboxylic organic acid containing 1 to 4 carbon atoms.

2 Claims, No Drawings

PROCESS FOR THE PREPARATION OF DIPHENOLS

This is a division of application Ser. No. 218,557; filed Jan. 17, 1972, now U.S. Pat. No. 3,836,591.

The present invention is concerned with a new process for the preparation of diphenols.

More precisely the present invention is concerned with an industrial process which gives high yields of hydroquinone and catechol under economical convenient conditions, starting from phenol, with a prevalence of the ortho-isomer.

The industrial importance of diphenols is well known (see for example Kirk-Othmer Encyclopedia Chem. Technolog., Second Ed. Vol. 11, page 462 (1966)) wherein many reactions and processes were studied for the preparation of diphenols.

However these processes are not quite satisfactory from the point of view of industrial realization and in particular, in so far as catechol is concerned, it is preferably prepared by extraction from natural products rather than by chemical synthesis.

Among the many considered reactions, the direct hydroxylation of phenol by means of hydrogen peroxide has been particularly studied (see for example Merz J. K. and W. A. Waters — J. Chem. Soc. (1949): Loebl, Stein and Weiss, J. Chem. Soc. 2074, (1949); G. R. A. Johnson, G. Stein and Weiss – J. Chem. Soc. 3275 (1951); E. Boyland, P. Sims — J. Chem. Soc. 2967 (1953); J. O. Konecny — J. Am. Soc. 76,4993 (1954). None, however, lead to an economically convenient process due to the low yields caused by the fact that diphenols are more sensible to the hydroxylating and oxydizing action of hydrogen peroxide than phenol; it is thus extremely difficult to control the reaction in such a manner to have it terminated when the primary oxydated product is formed (G. Stein and J. Weiss, J. Chem. Soc. 3265 (1951); S. J. Cosgreve and W. A. Water, J. Chem. Soc. 1726 (1951).

Particularly speaking hydroquinone and catechol are very easily oxydated to the corresponding quinones and successively degraded, so that as soon as the concentration of diphenols in the reaction mixture reaches an appreciable level, their further degradation competes with the primary oxydation of phenol.

We have now surprisingly found that if the direct hydroxylation of phenol with hydrogen peroxide is performed in the presence of particular acid catalysts and organic monocarboxylic acids having from 1 to 4 carbon atoms, under particular conditions of temperature and hydrogen peroxide concentration, it is possible to obtain a mixture of catechol and hydroquinone in very high yields and economically convenient conversions.

The reaction on which the present invention is based, may be schematically represented as follows:

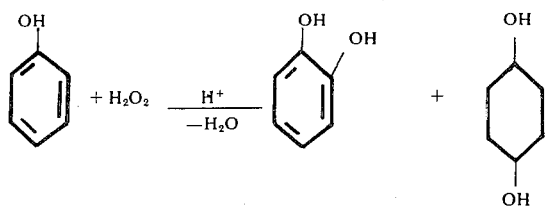

Two factors are determinant in carrying out the process according to the present invention: the kind of acid catalysis and the hydrogen peroxide concentration in the reaction mixture. This will extenuate the further attack of diphenols resulting in high yields of catechol and hydroquinone based upon converted phenol.

The acid catalysts which constitute a characteristic feature of the process according to the present invention, are inorganic and organic acids, selected from the group consisting of trifluoroacetic acid, and acids having a pH comprised between 0.7 and 3, preferably mono-, di-, tri-chloro acetic acid, oxalic acid, phosphoric acid, benzene, and toluene-sulphonic acids.

The monocarboxylic organic acids which must be used together with the above indicated acid catalysts are, formic, acetic, propionic and butyrric acid. Particularly convenient from an economical point of view is acetic acid.

The amount of catalyst to be used, with respect to the reacted phenol, lies between comparatively wide limits, depending on the acid selected for use. In any case, however, the amount of acid is preferably between 0.03 and 10% mol. with respect to phenol. It has been found for example that the preferred amount of trifluoroacetic acid to be used is between 0.2 and 10%.

The weight ratio between the acid catalyst and the monocarboxylic organic acid is preferably between 1:5 and 1:50.

We have also found that in the group of acid catalysts to be used to realize the process of the present invention, trifluoroacetic acid allows particularly mild temperature conditions and thus of realizing a process particularly convenient from an industrial point of view.

More particularly phenol reacts with hydrogen peroxide, in the presence of trifluoroacetic acid and monocarboxylic $C_1$-$C_4$ organic acids in the above defined proportion, at a temperature between 0° and 50°C, (in particular at room temperature) with a comparatively short reaction time.

The molar ratio of phenol: hydrogen peroxide is preferably between 20:1 and 4:1.

We have found that the remaining catalysts according to the present invention, having a pH between 0.7 and 3, in addition to needing slightly higher temperatures than trifluoroacetic acid, when accelerating the transformation reaction of phenol into catechol and hydroquinone with hydrogen peroxide, in a practically useful reaction time, that is at temperatures between 50° and 100°C, also need a sufficient concentration of $H_2O_2$ with respect to phenol in the reaction mixture in order to achieve high yields of diphenols based upon the converted phenol.

More precisely it is necessary to keep a minimum concentration of 5% of hydrogen peroxide with respect to phenol, and preferably a concentration ranging between 5 and 15%, by continuously feeding $H_2O_2$ in the reaction mixture in order to restore the reacted amount. As a matter of fact we found that using the indicated catalysts, with concentrations of hydrogen peroxide lower than 5% but as dilutions increase, (the remaining conditions being identical,) the oxydizing action of hydrogen peroxide is remarkably increased and the hydroxylating action, correspondingly decreased.

The catalysts according to the invention are preferably selected, from the group consisting of mono-, di-trichloro acetic acid, oxalic acid, phosphoric acid, and benzen- and toluen-sulphonic acids. They are used in amounts between 0.03 and 10% with respect to phenol.

In any case, in the process according to the present invention, it is preferred to maintain the conversion of phenol lower than 40%.

The yields in diphenols which may be reached are between 80 and 95% higher yields are also possible.

It is preferred, when the reaction is completed, to submit the reaction mixture to fractional distillation in order to recover the monocarboxylic acid, the catalyst and the excess of phenol which are directly recycled, it also allows one to separate catechol and hydroquinone in the pure state.

Only a slight residue of non volatile substances remain.

In order to better clarify the various features of the present invention and how to perform them, we give hereinafter some illustrative examples. These examples are not intented to limit the invention.

EXAMPLE 1

Into a 1 liter, 4 neck-flask, provided with stirrer, reflux cooler, thermometer and feeding funnel, 293 g of phenol, 9.4 ml of formic acid and 1.9 ml of trifluoroacetic acid are introduced; than the mixture is heated to 40°C and is added to a mixture consisting of 25.7 ml of formic acid and 24 ml of 39% hydrogen peroxide over a period of 8 minutes.

After 4 hours 8.64 g of hydrogen peroxide are consumed.

A sample of the reaction mixture is transformed into methyl ether and gas chromatographically analyzed by using 4-methyl-veratrol and p.cresolmethylether as internal standards.

The reaction mixture when tested shows a content of 7.95 g hydroquinone, 12.45 catechcol and 271.2 g of phenol. The overall yield in diphenols is 93.5%.

Distilling under vacuum the peroxy components, the carboxylic acid and the catalyst are recovered; the phenol (270 g), catechol (12.3 g) and hydroquinone are separated.

EXAMPLE 2

Into a 1 liter, 4neck-flask, equipped with stirrer, thermometer, reflux cooler and feeding funnel, are poured 293 g of phenol, 2.5 of 99% phosphoric acid and 14.2 ml of glacial acetic acid. The reaction mixture is heated to 80°C and added to a mixture consisting of 39 ml of glacial acetic acid and 24 ml of 39% hydrogen peroxide over a period of 8 minutes. The concentration of hydrogen peroxide is kept constant by continuously feeding new $H_2O_2$.

After 3 hours 10.58 g of hydrogen peroxide are consumed.

A sample of the reaction mixture is gas-chromatographically analyzed with the method of the internal standard, after having been transformed into methyl ethers as in the preceding examples.

The reaction mixture contains 13.8 g of catechol, 8.45 g of hydroquinone and 267.3 g of phenolo Yield on the phenol is equal to 86.5%. Distilling the reaction mixture under vacuum the peroxy reagants, the carboxylic acid and phenol (266.5 g), catechol (13.7 g) and hydroquinone (8.2 g) are recovered.

EXAMPLE 3

Into a 1 liter, 4neck-flask, equipped with stirrer, reflux cooler, feeding funnel and thermometer, are poured 293 g of phenol, 2.5 g of 99% phosphoric acid and 14.2 ml of glacial acetic acid. The mixture is warmed to 80°C and added to a mixture consisting of 39 ml of glacial acetic acid and 24 ml of 39% hydrogen peroxide over 8 minutes. After keeping the mixture for 6 hours at 80°C, 9.52 g of hydrogen peroxide are consumed. A sample is analyzed as in Example 2. An overall content of 7 g catechol, 3.78 g hydroquinone and 272.5 g of phenol is found.

Diphenols yield as high as 52.5%. By distilling under vacuum, as in Example 2, 271.5 g of phenol, 6.9 g of catechol and 3.65 g of hydroquinone are recovered.

EXAMPLE 4

Into a 1 liter, 4 neck-flask equipped with stirrer, thermometer, reflux cooler and feeding funnel, are poured 293 g of phenol, 4 g of trichloroacetic acid and 9.4 ml of formic acid.

The reaction mixture is heated to 60°C and added to a mixture consisting of 25.7 ml of formic acid and 24 ml of 39% hydrogen peroxide. The hydrogen peroxide concentration is kept constant by continuously feeding fresh hydrogen peroxide.

12 g of hydrogen peroxide are consumed after 40 minutes. As sample is gas-chromatographically analyzed as in Example 2.

The mixture was found to consist of 15.62 g of catechol, 9.98 g of hydroquinone and 264.5 g of phenol.

Yield on the phenol — 90%.

By distilling the reaction mixture under vacuum, the peroxy compounds, the carboxylic acid, the catalyst and the excess phenol are recovered which are recycled in admixture without separating the various components. Finally 9.9 g of hydroquinone and 15.5 g of catechol are recovered.

EXAMPLE 5

It has been performed in the identical manner as Example 4 only using 0.018 g of p.toluensulphonic acid instead of trichloroacetic acid. The same conversion was obtained with a yield on the converted phenol as high as 88%; the catechol hydroquinone ratio was also the same.

I claim:
1. In a process for the preparation of catechol and hydroquinone in admixture by the hydroxylation of phenol
    with hydrogen peroxide
    in the presence of an alkanoic acid having 1 to 4 carbon atoms and
    a catalytically effective amount of phosphoric acid, the improvement which comprises constantly maintaining the hydrogen peroxide concentration between 5 and 15% by moles with respect to phenol by continuous feeding.
2. A process for the preparation of catechol and hydroquinone in admixture comprising
    hydroxylating phenol
    with hydrogen peroxide at a constant concentration with respect to phenol
    in the presence of an alkanoic acid having 1 to 4 carbon atoms and
    a catalyst selected from the group consisting of monochloroacetic acid, dichloroacetic acid, trichloroacetic acid, oxalic acid, benzensulfonic acid, and toluensulfonic acid present in an amount between 0.03 and 10% by moles with respect to phenol
    at a temperature between 50° and 100°C wherein the concentration of hydrogen peroxide with respect to phenol is constantly kept between 5 and 15% by continuously feeding hydrogen peroxide in the reaction mixture.

* * * *